UNITED STATES PATENT OFFICE.

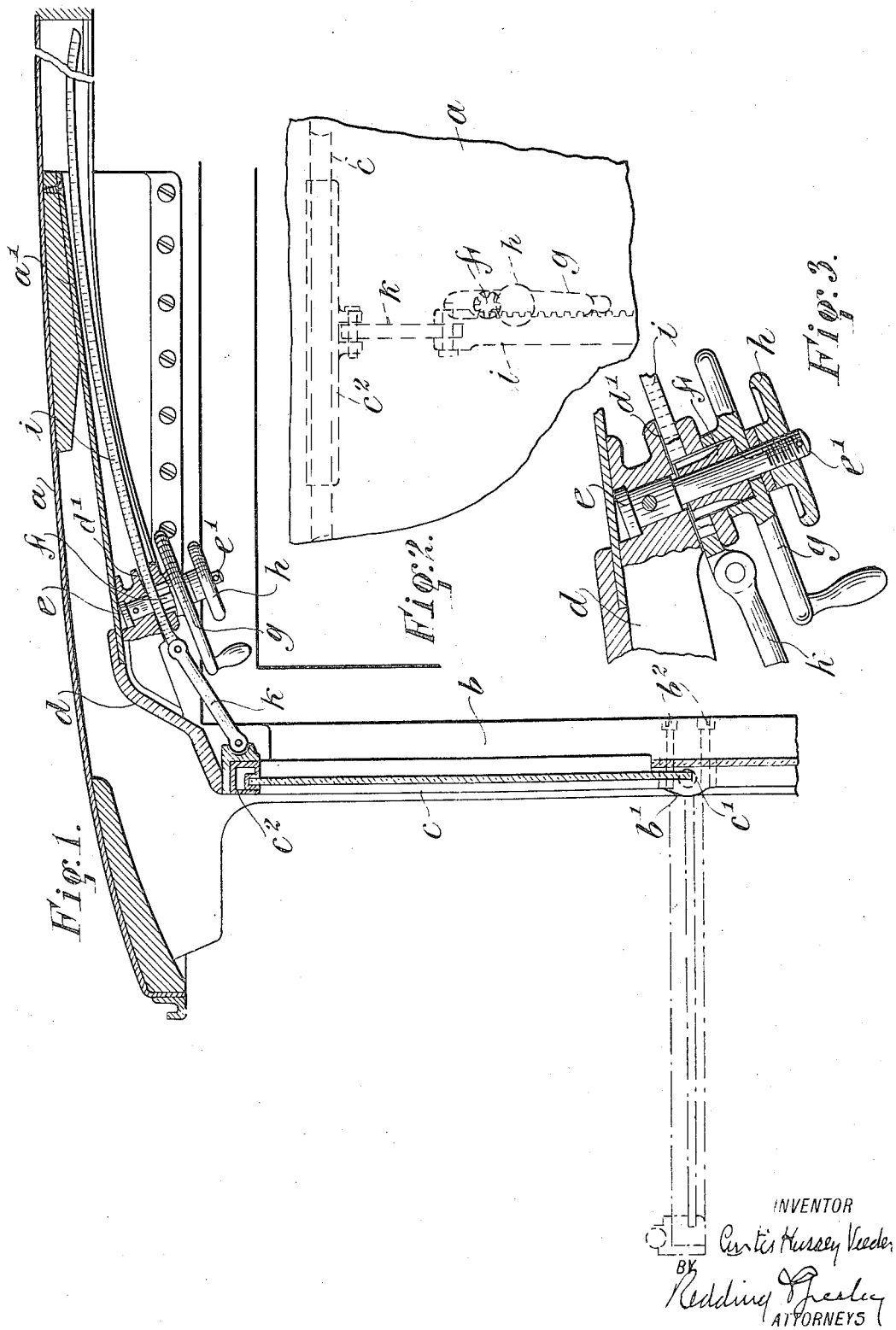

CURTIS HUSSEY VEEDER, OF HARTFORD, CONNECTICUT, ASSIGNOR TO THE VEEDER MANUFACTURING CO., OF HARTFORD, CONNECTICUT, A CORPORATION OF CONNECTICUT.

WINDSHIELD FOR AUTOMOBILES.

1,410,970.      Specification of Letters Patent.      Patented Mar. 28, 1922.

Application filed October 8, 1921. Serial No. 506,286.

*To all whom it may concern:*

Be it known that I, CURTIS HUSSEY VEEDER, a citizen of the United States, and a resident of the city of Hartford, in the State of Connecticut, have invented certain new and useful Improvements in Windshields for Automobiles, of which the following is a specification, reference being had to the accompanying drawing, forming a part hereof.

This invention relates to the means for adjusting and securing in adjusted position the hinged or pivoted section of a windshield. The upper section of an automobile windshield is usually hung, sometimes at its upper edge and sometimes at its lower edge, on trunnions and is swung to desired position by direct application of the hands to the adjustable section. It is sometimes held in position by clamps on the trunnions and sometimes by segments or rods which slide through suitable clamping devices. In practice it is usual to release the clamp or clamps and then with one hand move the adjustable section to desired position and with the other manipulate the clamping device at one end of the windshield in order to retain the windshield in adjusted position, the clamping device at the other end being subsequently tightened. This operation requires the use of both hands, it frequently results in pinched fingers and consumes considerable time. It is the object of this invention to provide means whereby the entire operation, including the adjusting and the clamping, can be performed with one hand and can be performed more conveniently, more quickly, with the expenditure of less effort, and with much less danger of injury than is possible with the devices heretofore employed for the purpose, and whereby the windshield can be secured in adjusted position with greater certainty. The invention will be explained more fully hereinafter with reference to the accompanying drawing in which—

Figure 1 is a view in vertical section showing so much of the top and windshield of an automobile as is necessary to enable the application of the invention thereto to be understood.

Figure 2 is a partial top view of some of the parts shown in Figure 1.

Figure 3 is a detail view in section.

The embodiment of the invention illustrated in the drawing is designed particularly for application to an automobile having a closed body, that is, a fixed top $a$ and a fixed windshield frame $b$. The upper or adjustable section $c$ of the windshield is shown as provided at its lower corners with trunnions $c'$ which are received in trunnion blocks $b'$ secured to the frame $b$ as by screws $b^2$. At the upper edge of the windshield frame is a bracket $d$ which furnishes a support for a stud $e$ on which is mounted rotatably a pinion $f$. The later has secured thereto a hand-wheel or handle $g$ and upon the threaded outer end $e'$ of the stud $e$ is mounted a clamping wheel $h$, so that the hand-wheel $g$ and the pinion $f$ can be secured in adjusted position. Mounted to slide in a suitable guideway $d'$ is a rack $i$, which may be curved, in a vertical plane, as shown and may be received within a pocket $a'$ formed therefor below the top $a$. At its forward end the rack $i$ is connected, as by a link $k$ with the section $c$, as to the bar $c^2$.

Upon loosening the clamping nut $h$ the pinion $f$ can be rotated by the hand-wheel or handle $g$ and the adjustable section of the windshield can be swung to desired position. Then, with the same hand, the clamping nut $g$ can be tightened and the adjustable section will be held thereby in adjusted position. The desired adjustment of the windshield can thus be effected with one hand and with a minimum of effort and the windshield can then, with the same hand, be locked securely in adjusted position.

It will be understood that various changes in details of construction and arrangement will be made to suit different conditions of use and that, except as pointed out in the claim, the invention is not limited to the precise construction shown and described herein.

I claim as my invention:

The combination of a swinging windshield, a rack operatively connected to the windshield, a stud, a pinion mounted on the stud and in engagement with the rack, a handle for the pinion and a clamping nut mounted on the stud to hold the pinion against rotation.

This specification signed this 6th day of October, A. D. 1921.

CURTIS HUSSEY VEEDER.